United States Patent [19]
Boutet

[11] Patent Number: 5,811,795
[45] Date of Patent: *Sep. 22, 1998

[54] BOW-TIE LASER SCAN TRACE USING DYNAMIC LASER POSITIONER

[75] Inventor: John Claude Boutet, Rochester, N.Y.

[73] Assignee: Eastman Kodak Company, Rochester, N.Y.

[ * ] Notice: The term of this patent shall not extend beyond the expiration date of Pat. No. 5,691,535.

[21] Appl. No.: 597,416

[22] Filed: Feb. 8, 1996

[51] Int. Cl.$^6$ .................................................. H01J 3/14
[52] U.S. Cl. ........................... 250/234; 250/582; 358/474
[58] Field of Search ................................. 250/234, 580, 250/581, 582, 583, 584, 585; 358/471, 474, 480; 359/214

[56] References Cited

U.S. PATENT DOCUMENTS

| | | | |
|---|---|---|---|
| 4,352,984 | 10/1982 | Ohara | 250/234 |
| 5,122,659 | 6/1992 | Agano | 250/585 |
| 5,488,489 | 1/1996 | Miyagawa | 358/474 |
| 5,638,189 | 6/1997 | Yanagisawa | 250/234 |

*Primary Examiner*—Edward P. Westin
*Assistant Examiner*—Kevin Pyo
*Attorney, Agent, or Firm*—William F. Noval

[57] ABSTRACT

Method and apparatus for scanning in a bow-tie pattern, where such pattern is effectuated by either directing a beam or aiming a laser. Methods are provided for correcting errors in movement of the beam. One such method includes the use of a calibration grating on a recording media, with the data derived from the calibration table being used to generate a lookup table. The lookup table providing correction factors that serve to diminish variations in the beam path.

22 Claims, 19 Drawing Sheets

← PAGE-SCAN (Y x 400)

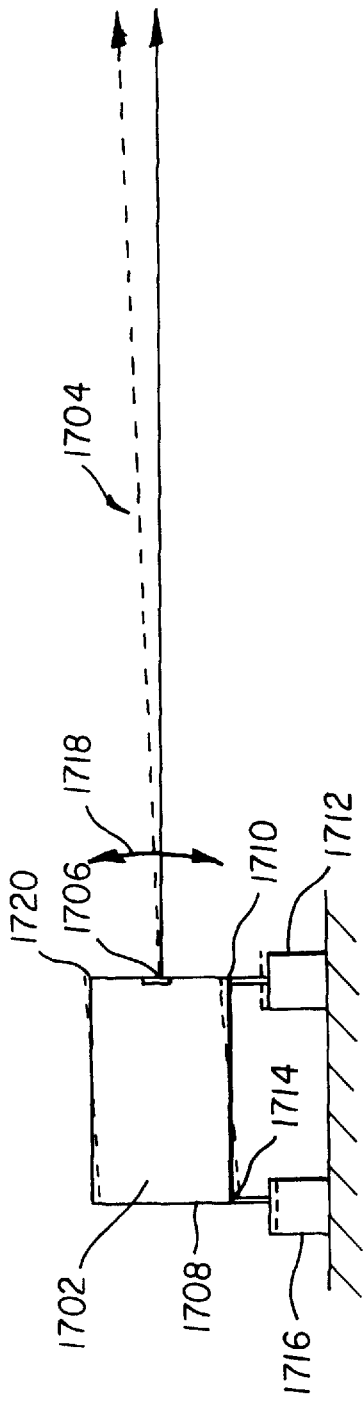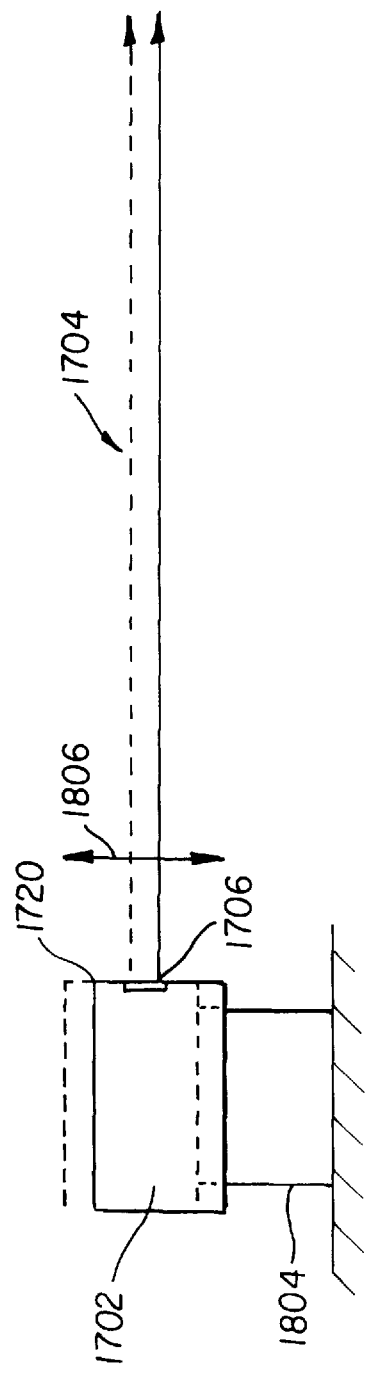

BOW-TIE LASER SCAN TRACE USING DYNAMIC LASER POSITIONER

FIELD OF THE INVENTION

The invention relates to scanning systems comprising a beam that transversely scans a continuously moving medium. The invention is particularly applicable to the field of computed radiography.

BACKGROUND OF THE INVENTION

In standard medical x-rays a sheet of film is placed between two phosphor sheets. The x-rays cause the phosphor to fluoresce, thereby exposing the film. With this method it is critical to insure appropriate exposure for the desired density.

The x-rays also excite phosphors when using storage phosphorous material. Part of the absorbed x-ray energy causes instantaneous fluorescence, but a significant part is stored in the phosphor and is not emitted as light until this type of media is discharged. The media is discharged by scanning a red laser light beam across the phosphor. The red light excites the phosphor causing the release of stored energy as blue light The amount of blue light emitted from each pixel area of the phosphor surface is measured and represents the quantity of x-ray exposure if the stimulating energy is constant. It is therefore critical to maintain uniform exposure when discharging storage phosphorous material. Non-uniformity may be caused by varying velocity in either the page-scan or line-scan direction, fluctuations in laser power, and vibrations affecting the linearity of the scanning beam path.

In many scanning applications, such as film scanning, laser printing, or storage phosphor scanning, a galvanometer moves a mirror that translates the laser spot across the media in the line-scan direction. During this translation, data is read or printed pixel by pixel as the spot traverses the media. When the spot has completed its traverse, the line-scan galvanometer flies back to its initial line start position to start scanning the next line. Page-scan is generally accomplished by slowly translating the media past the line-scan position or in some cases by slowly translating the line-scan position along the stationary media with a second galvanometer.

The spot velocity profile in the line-scan direction is of a sawtooth nature with, ideally, a constant velocity during the data transfer part of the scan and a near-instantaneous sinusoidal profile during the fly back portion. The speed of the constant velocity portion of the scan is limited by the maximum data transfer rate capabilities of the system. The speed with which the fly back is accomplished is a function of the inertia of the galvanometer system, and the power constraints of the galvanometer and driving circuitry. The galvanometer needs to overscan the media slightly to steady out before line start. The duty cycle (data transfer time/total scan time) for a system of this type is a function of the data transfer rate and the fly back characteristics of the galvanometer system. For a storage phosphor reader in a computed radiography system the data transfer rate will be limited by factors such as laser power, phosphor persistence and the bandwidth of the electronics. As these factors are improved to achieve faster data transfer, the duty cycle decreases unless the fly back characteristics of the galvanometer are also improved. Duty cycles in the 70% to 85% range are typical at present.

One way to avoid the time losses of fly back is to scan bidirectionally. In this scheme data is transferred as the spot travels from left-to-right and as it travels from right-to-left. A drawback of this zigzag scan is non-uniform line spacing. This reduces resolution near both ends of the line-scan. In the cases of printers and destructive scanning in computed radiography readers there is also density non-uniformity resulting from line spacing variation. Additional problems arise in bidirectional scanning from the increased visibility of pixel positioning errors caused by galvo velocity fluctuations.

SUMMARY OF INVENTION

According to the present invention there is provided a solution to the problems noted above.

According to the present invention there is provided a method and apparatus for scanning in a bow-tie pattern, where such pattern is effectuated by either deflecting a beam or aiming a laser. Where the pattern is effectuated by deflecting a beam, a first moveable mirror scans a laser beam in a page-scan direction, while a second, bidirectional, moveable mirror scans a laser beam across the media in a line-scan direction. The latter scan begins at a location on a first edge of the media and ends at a location at a second, opposing edge of the media. While this line scan takes place the first movable mirror slowly moves the spot one line pitch in the page scan direction. When the spot reaches the end of the line-scan, the first moveable mirror rapidly redirects the beam one line pitch in a direction opposite that of page-scan and the second moveable mirror reverses direction, directing the beam in a reverse line-scan direction. Again, while line scan takes place the first movable mirror slowly moves the spot one line pitch in the page scan direction. When the laser beam reaches the end of the reverse line-scan, the first moveable mirror rapidly redirects the beam one line pitch in a direction opposite that of a page scan. This pattern is repeated throughout the duration of the scan. Means are provided for correcting errors in the moving beam.

Where the pattern is effectuated by aiming a laser, at least one of a laser diode or lens is moved transversely to the beam by a positioner, thereby affecting the positioning of the emitted beam. The movement of the beam may be either a pivoting or a translating movement. According to the invention, uniform exposure is maintained through the use of a calibration grating on a recording media, with the data derived from the calibration table being used to generate a look-up table. The lookup table provides correction factors, which serve to diminish variations in the beam path and maintain uniform exposure.

BRIEF DESCRIPTION OF THE DRAWINGS

FIG. 17 is a schematic view of a pivoted laser assembly.

FIG. 18 is a schematic view of a translated laser assembly.

DETAILED DESCRIPTION OF THE DRAWINGS AND THE INVENTION

Figure 1:
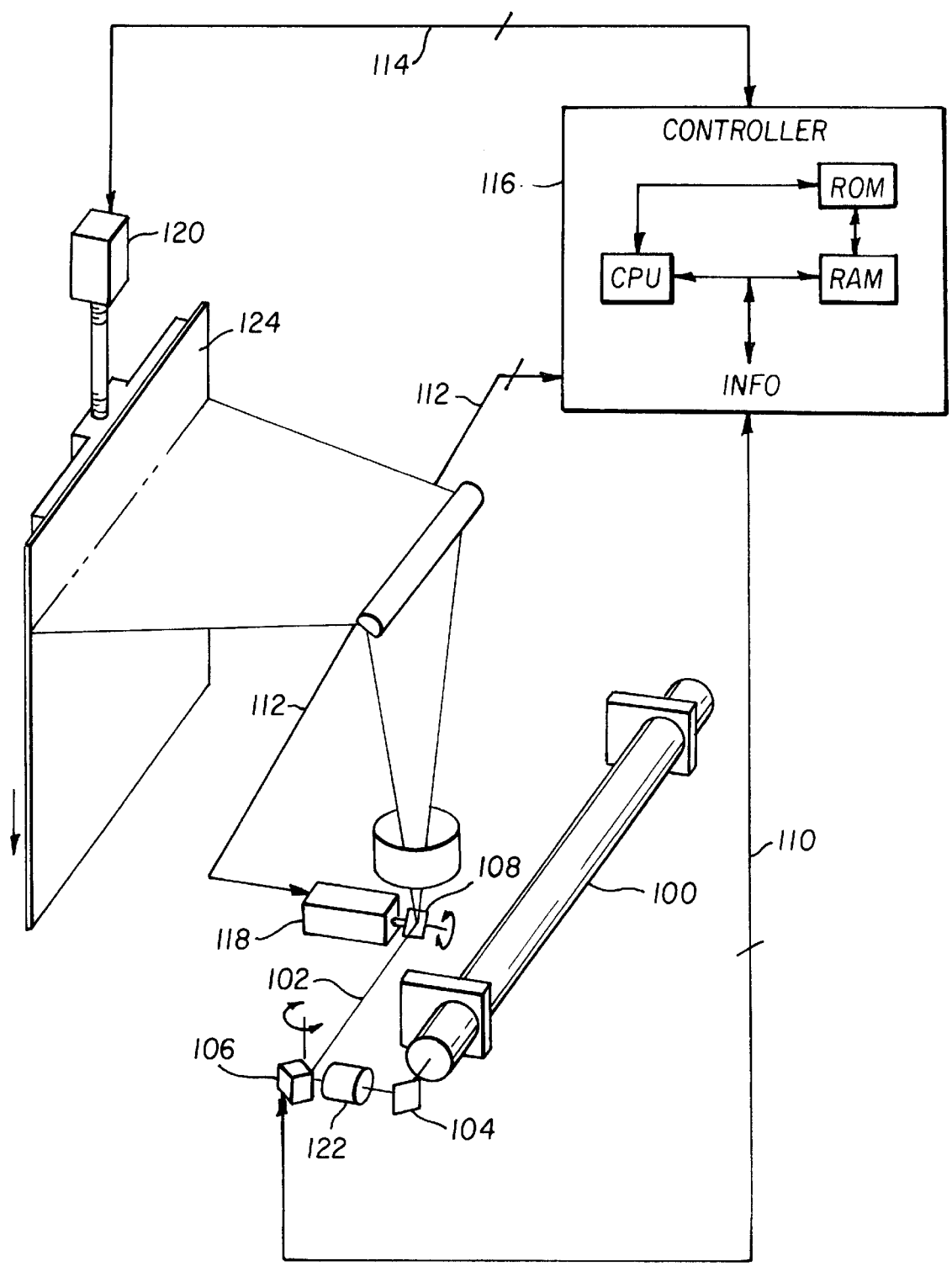
FIG. 1 is a schematic view of a laser system.

FIG. 1 is a schematic view of a laser system. The laser system includes laser 100, which emits beam 102. Beam 102 is directed by stationary mirror 104, focused by lens 122 and directed by a first moveable mirror such as piezo-electric mirror 106 and a second, bidirectional, moveable mirror such as galvanometer mirror 108. Piezo-electric mirror 106 tracks media 124 motion in the page-scan direction while galvanometer mirror 108 scans beam 102 across media 124 in the line-scan direction. When beam 102 reaches the end of a line-scan, piezo-electric mirror 106 returns one line pitch while galvanometer mirror 108 reverses direction of beam 102.

In the laser system depicted in FIG. 1, first control bus 110 connects controller 116 to first moveable mirror 106; second control bus 112 connects controller 116 to galvanometer 118; and third control bus 114 connects controller 116 to media driver 120. An example of media driver 120 is a motor coupled to a lead screw that translates the carrier stage for moving media 124 at selected speed. Data is transmitted via buses 110, 112, and 114 to controller 116 where it is processed. Control signals transmitted via buses 110, 112, 114, control the position of first moveable mirror 106, second moveable mirror 108 and control the operation of media driver 120, respectively.

Figure 2:
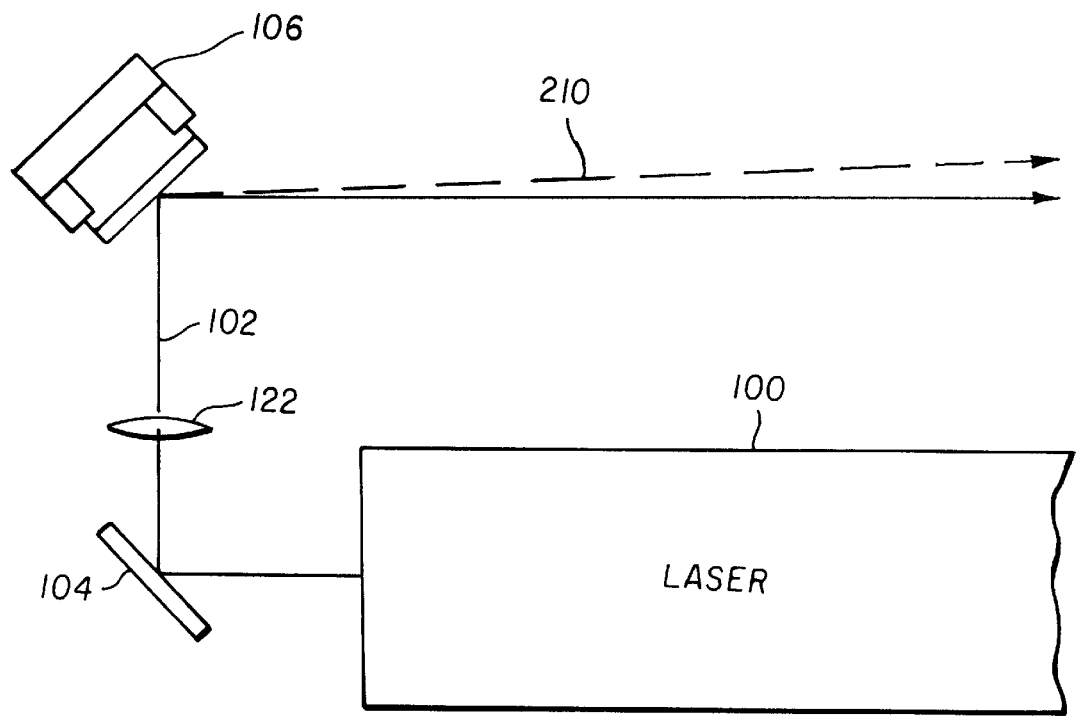
FIG. 2 is a schematic view of a portion of a laser system.

As shown in FIG. 2, laser 100 emits beam 102 along a path toward stationary mirror 104 through focusing lens 122 to a first moveable mirror such as piezo-electric mirror 106. Beam 102 is deflected by piezo-electric mirror 106 to a position shown by a vertical (media direction) deflection 210.

Figure 3A:
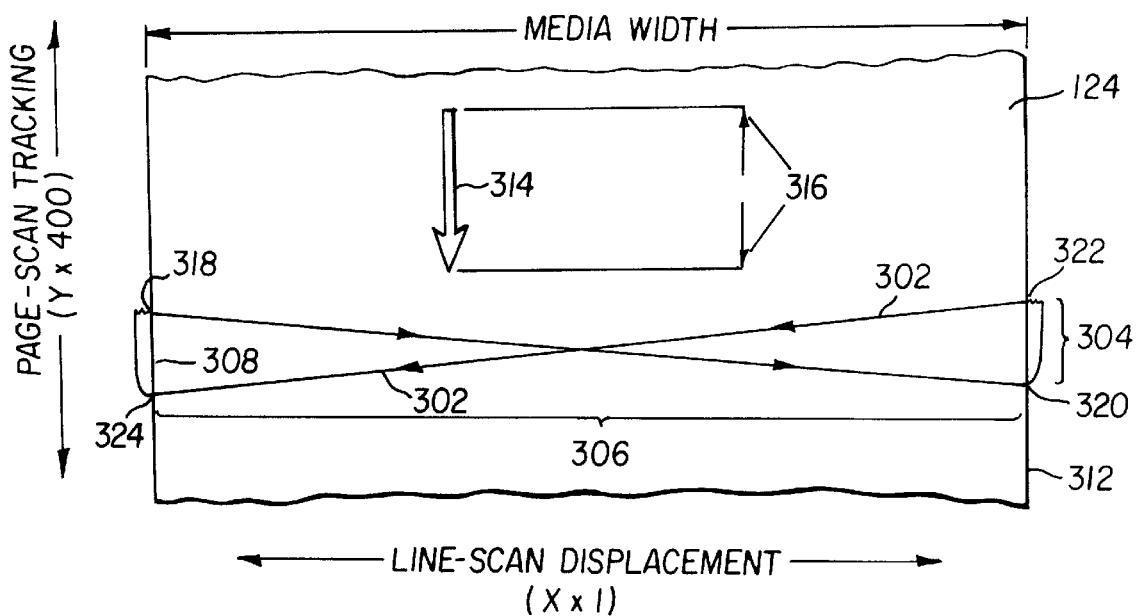
FIG. 3a is an explanatory diagram of a bow-tie laser trace as seen by a stationary observer.

A resulting "bow-tie" pattern 302 is shown in FIG. 3. Beam 102 is moved by piezo-electric mirror 106 and galvanometer mirror 108. Height 304 of bow-tie 302 is one line pitch and width 306 is the length of the line-scan. If for instance the pixel pitch is 100 microns in X and Y and a scan line contains 2,000 pixels, the "bow-tie" is 100 microns high and 200,000 microns wide. With this type of scanning system and method described hereinafter, it is possible to achieve a 95% or better duty cycle, where the duty cycle is defined as data transfer time divided by total scan time.

As represented in FIG. 3, the beam scans a path beginning at first location 318 on first edge 308 of media 310, moving across media 310 to second location 320, on opposing edge 312 of media 310, in a direction traversing media travel 314. The beam continues moving parallel to second opposing edge 312 in a direction opposite that of media travel 314 for a distance equal to one-half of media travel during one full bow-tie cycle 316, to third location 322. The beam continues moving across media 310 traverse to the direction of media travel 314 to fourth location 324. The beam continues moving along first edge 308 of media 310 for a distance equal to one-half of media travel during one full bow-tie cycle 316, thereby returning to the beginning point of the bow-tie pattern, first location 318. This pattern is repeated throughout the duration of the scan.

Figure 3B:
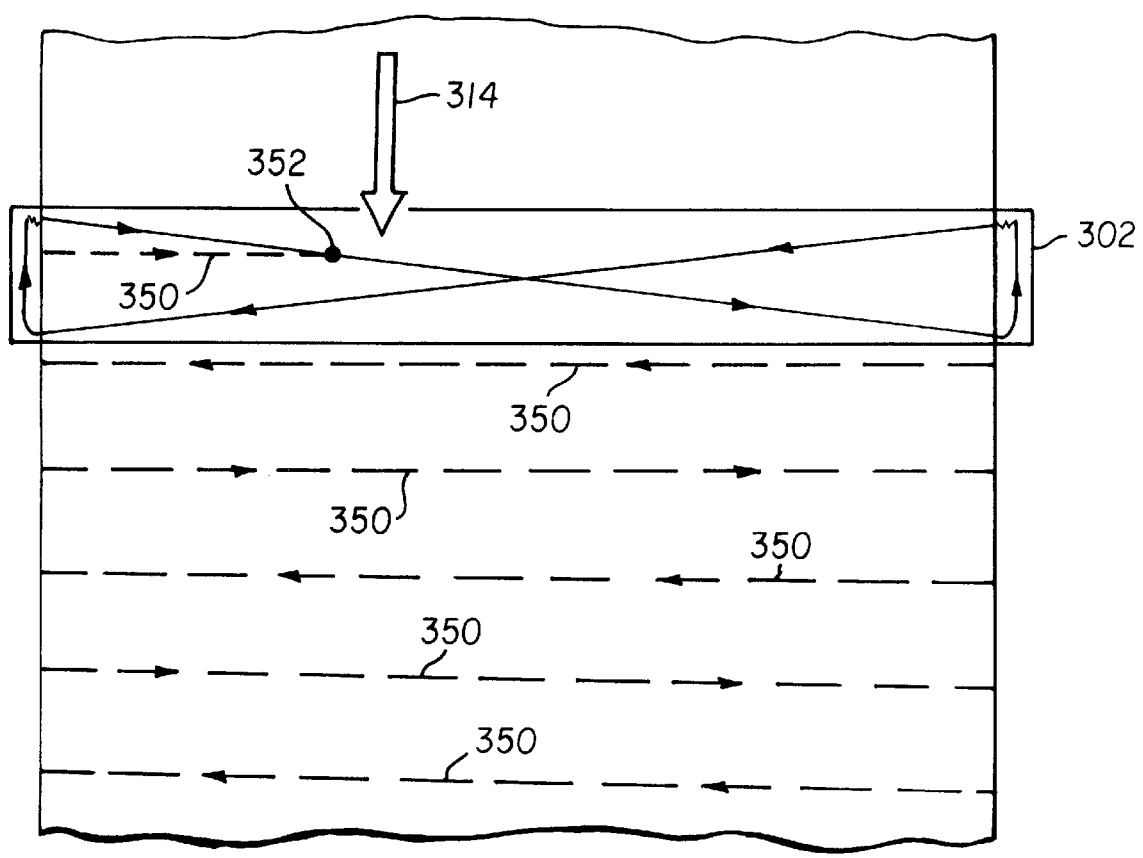
FIG. 3b is an explanatory diagram of an image resulting from a bow-tie laser pattern.

Turning to FIG. 3b, there is shown an explanatory diagram showing scan trace pattern 350 created on the media by a beam spot 352 following bow-tie pattern 302 with constant media travel 314. As depicted, resulting image 350 comprises a series of parallel lines.

Figure 4:
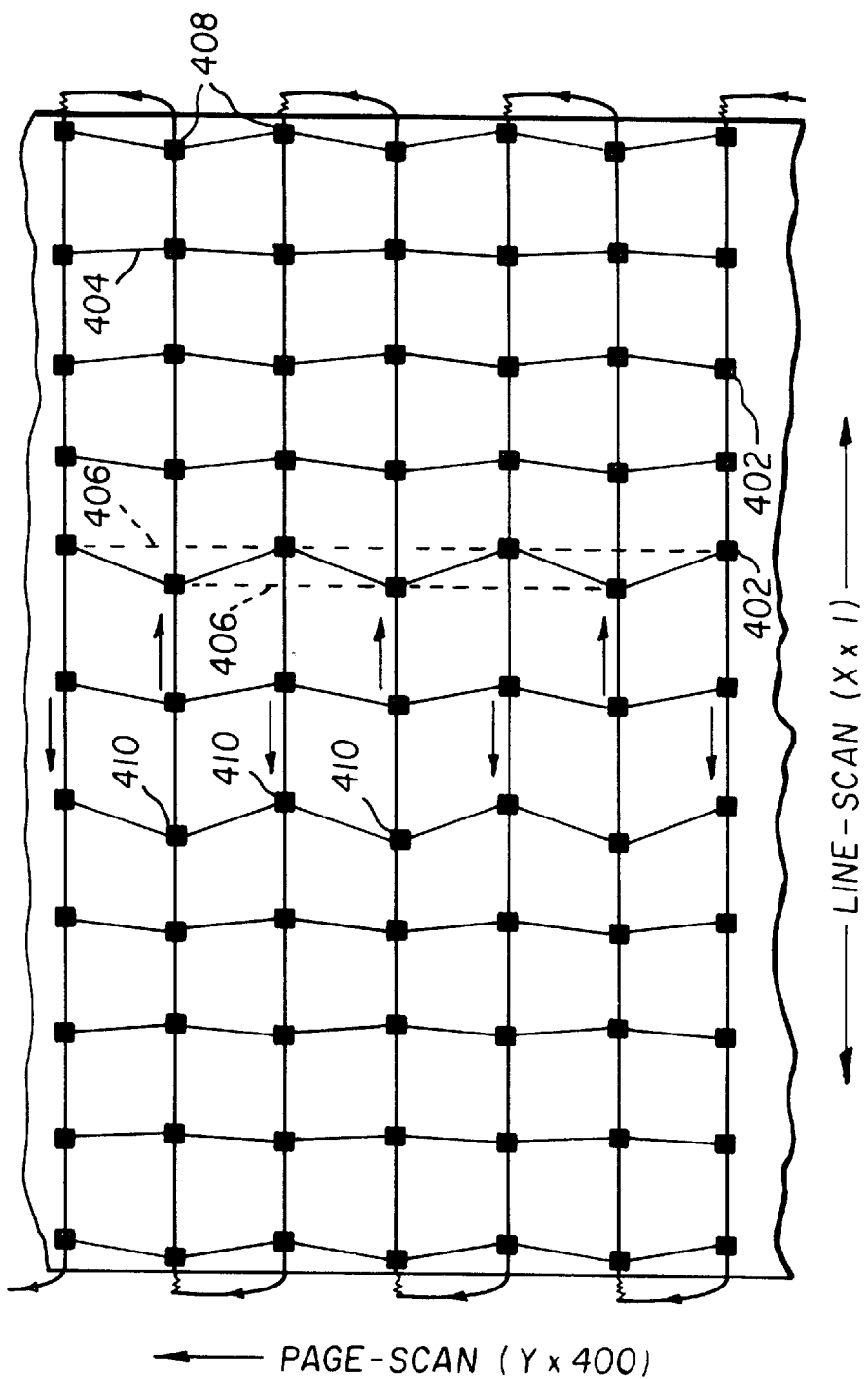
FIG. 4 is an explanatory diagram showing a bidirectional scan with constant media and page-scan tracking velocities, repeatable galvanometer velocity variation, and pixels clocked at equal time increments.

A bow-tie scan requires very accurate positioning of the spot of beam 102 since positioning errors will not be hidden as they are in the conventional sawtooth scan. FIG. 4 shows a bidirectional scan for which media velocity and page-scan tracking mirror velocity are constant, pixels are clocked at equal time increments and the galvanometer velocity varies significantly within each line but repeatably from line to line. Significant horizontal pixel offset position errors 410 are evident in adjacent lines 402. Such horizontal offset, when small, will appear as blurring of narrow vertical features 404 and, when large, will show double images of fine vertical features 406. Additionally, due to this velocity variation, lines 408 traced across the media are not perfectly straight. Considering that the vertical positioning error in FIG. 4 is shown at 400x, this vertical error is minor compared to the horizontal error shown at 1x. In a scanner of this type, one of the biggest source of "X" position error results from not knowing when to set line start for left-to-right scans vs. right-to-left scans.

Figure 5:
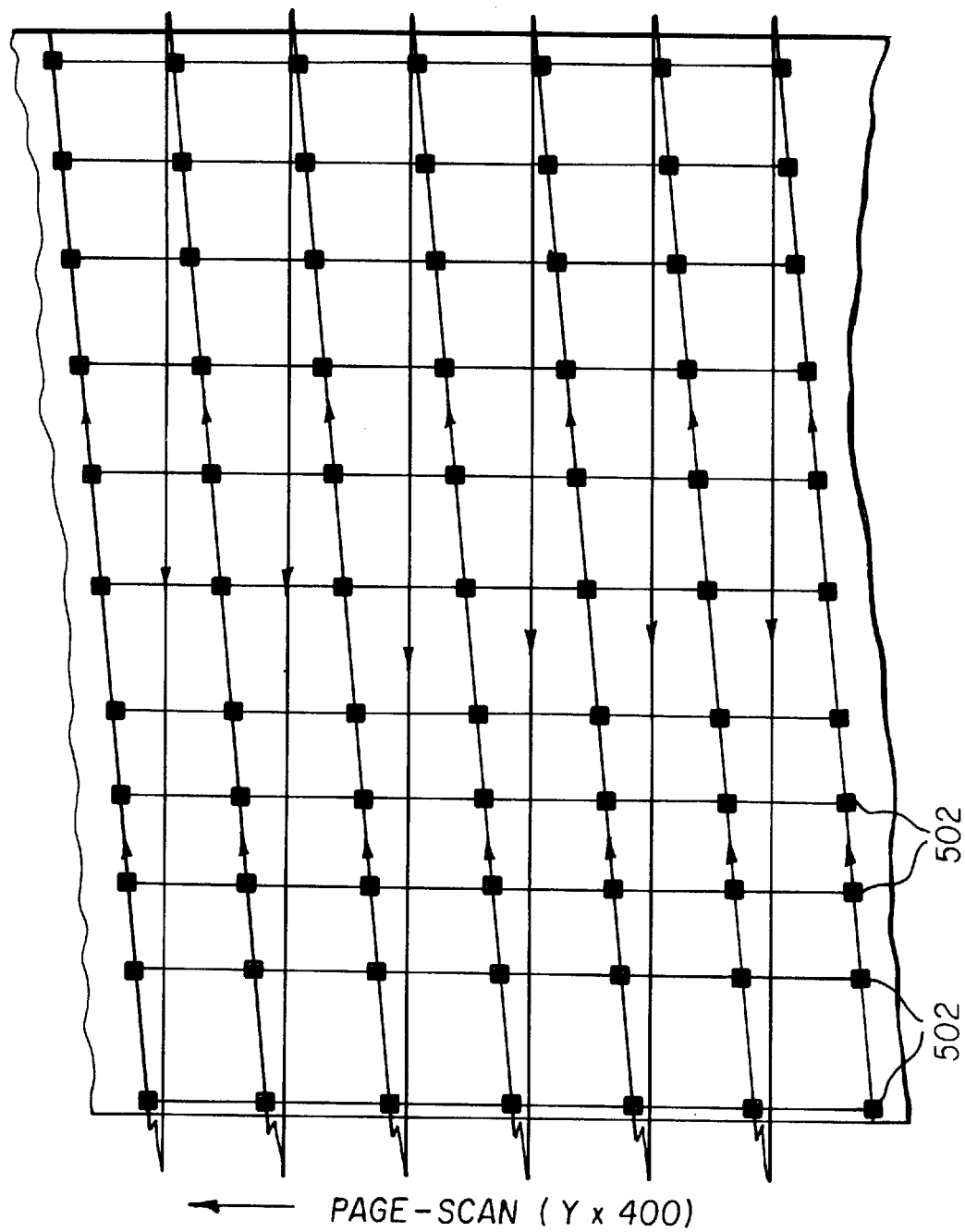
FIG. 5 is an explanatory diagram showing the same repetitive position errors in a conventional sawtooth scan.

In FIG. 5 the same repetitive position errors 502 line up in a standard sawtooth scan, making them much harder to detect. Even if the vertical positioning errors were much greater, they would line up and nest in a sawtooth scan as long as they are consistent and repeatable. Shifting line start in a sawtooth scan simply shifts the whole image relative to line start rather than offsetting succeeding lines of data relative to one another.

Figure 6:
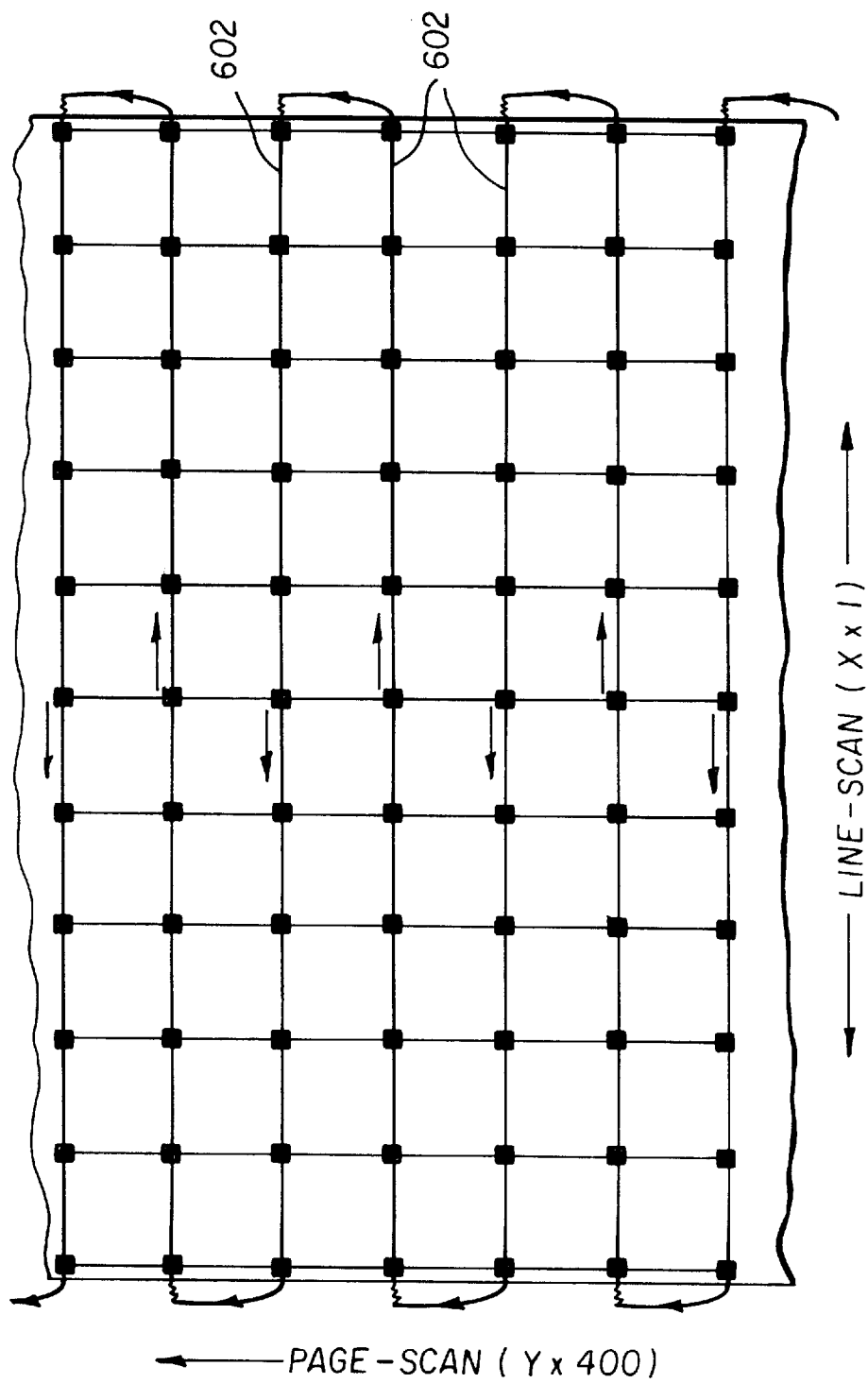
FIG. 6 is an explanatory diagram showing a bidirectional scan with constant media and page-scan tracking velocities, repeatable galvanometer velocity variation, and pixels clocked at equal position (x) increments.

FIG. 6 shows the same scan conditions as shown in FIG. 4 except that the pixels are clocked at equal displacement increments in the X direction. In one embodiment this is accomplished by reflecting a small part of the beam to scan a grating to obtain a position signal to clock data reads. This is done by using a beam splitter down stream of the galvo to redirect a small percentage of the scanning beam as a reference beam to a grating placed in front of a light collecting device. By using the reference beam intensity signal drops, caused by the grating's equally spaced marks, as clocking signals, equally spaced data reads can be obtained. This approach solves most of the "X" position errors described for FIG. 4.

Velocity variations, however, are still present in this scan with resulting minor vertical pixel positioning errors resulting in scan lines 602 that are not straight. In the case of computed radiography, signal strength variations can result from both velocity variations of the beam and space variation between scan lines. Factors other than galvanometer velocity variations also cause vertical positioning errors in the spot trace. These factors include: forces from the galvanometer coils causing the shaft to bend as it pivots, the bearings having some play or noise in them, or the dynamic forces on the shaft and/or mirror causing distortions.

Figure 7:
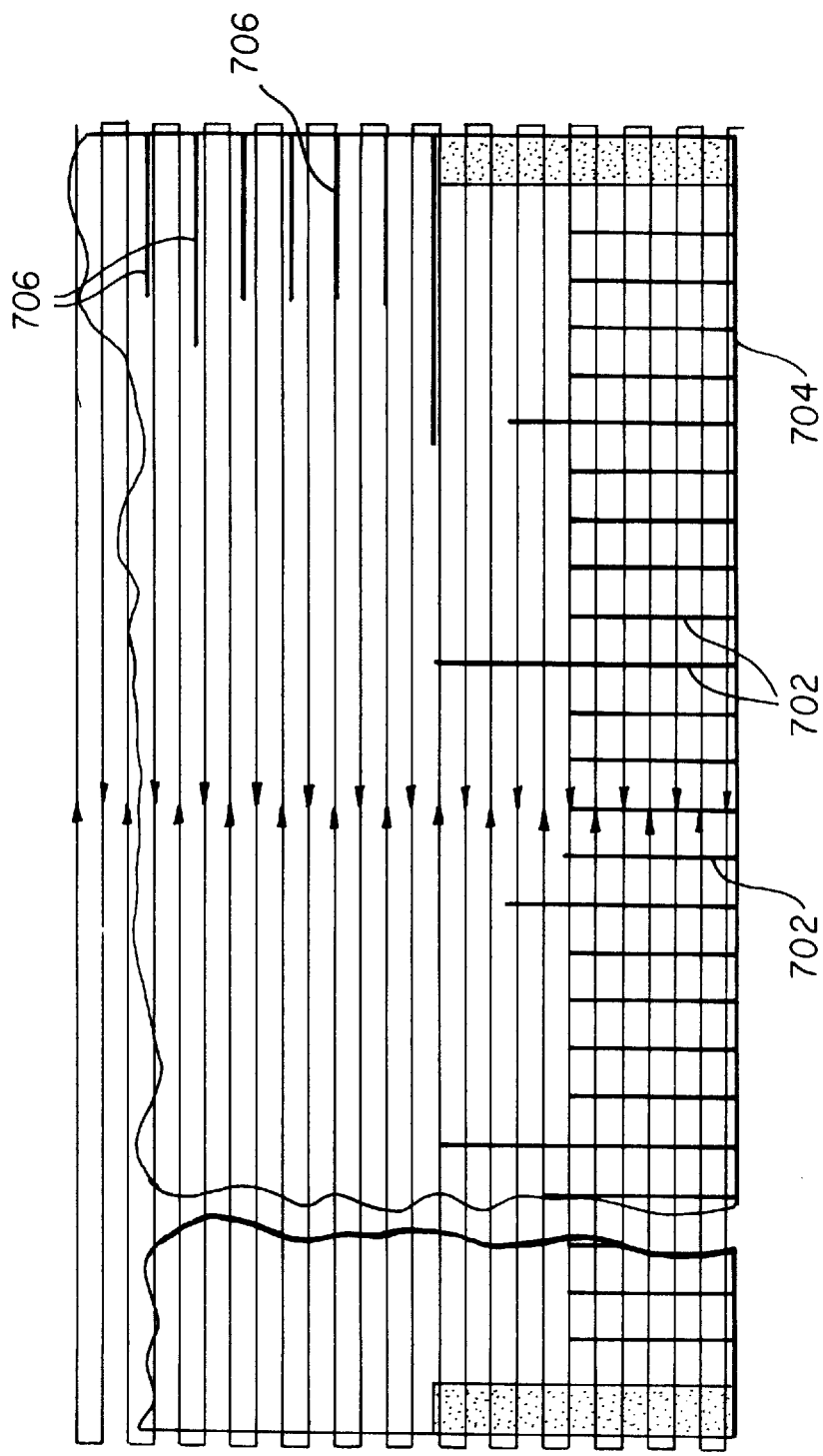
FIG. 7 is a schematic view of a calibration grating.
Figure 8:
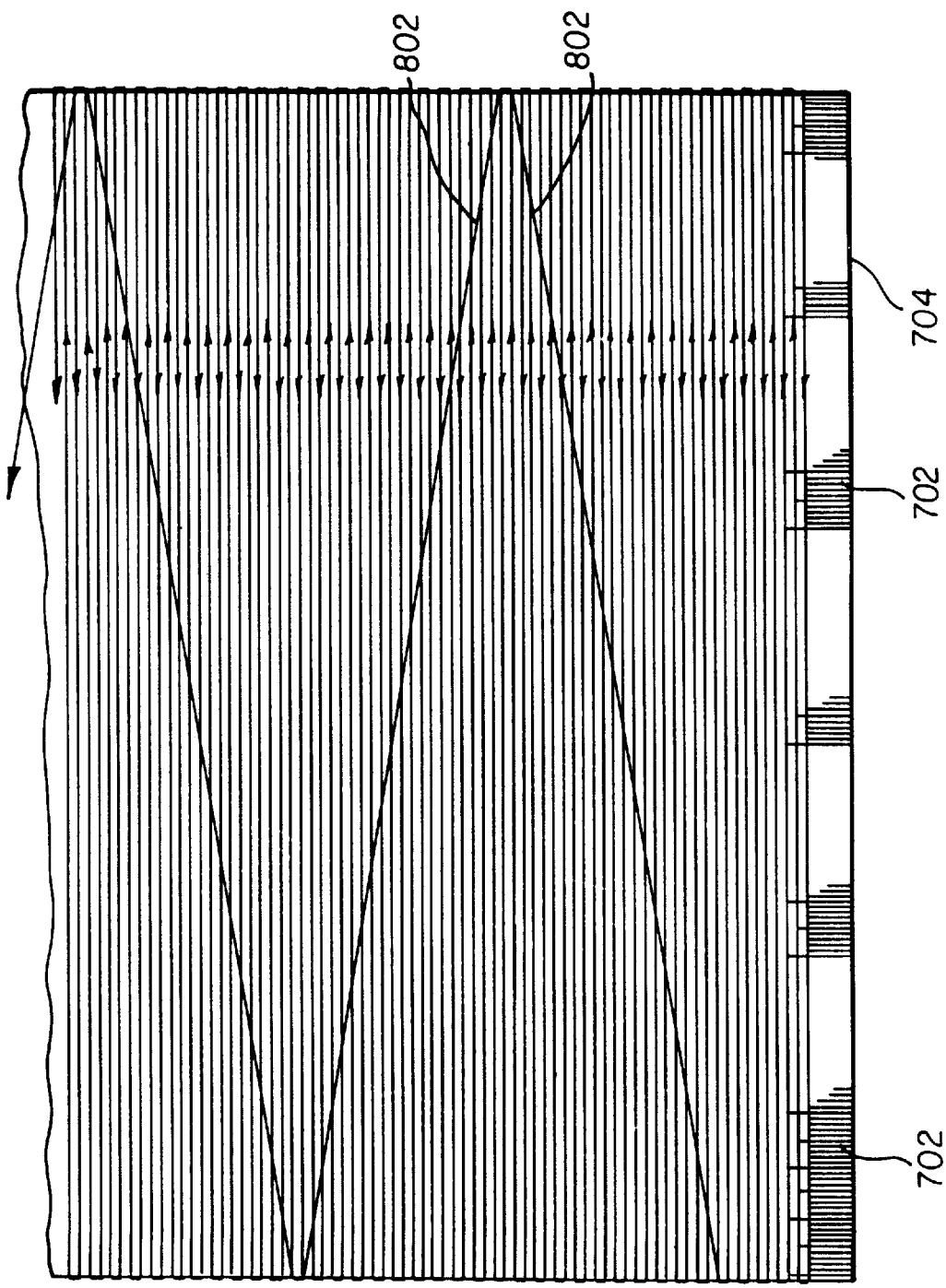
FIG. 8 is a schematic view of a recording media with calibration grating and energy troughs.

A way to correct for either or both galvanometer velocity variations and data collection clocking errors is shown in FIGS. 7 and 8. A calibration grating 702 is provided at the lead edge of storage phosphor sheet 704 (or a calibration sheet of film for a film digitizer). Line start for both left-to-right and right-to-left scans can be set relative to calibration grating 702 at the lead edge of the sheet. Once the line starts and line ends of sequential lines have been aligned, the data can be examined to see if the grating line data from left to right and right to left is aligned all the way across the scan. Misalignments would indicate local velocity fluctuations in the galvanometer scan speed and the collected data would provide the necessary information to generate a lookup table to correct these errors. The fluctuations are often different depending on the direction of the scan, i.e., they are different for right and left scans. This is solved by generating different correction data for the respective lookup tables. The correction data can be used to generate an altered pixel clocking which achieves equal pixel spacing in spite of the varying spot velocity. Preferably, the data is used to alter the galvo velocity profile to achieve a constant spot velocity on the phosphor so that pixel clocking at equal time increments yields equal pixel spacing.

In a preferred embodiment, the grating represents common units such as millimeters and can also serve as a scale verification for the radiologist. The grating for instance would show one millimeter tick marks with longer marks every centimeter. FIG. 7 shows a similar grating printed along the side edge of screen 706 providing scale verification on that axis for the radiologist. (Note that in FIG. 7, scan lines are shown at 400x spacing in the page scan direction for illustration purposes, while the scale on the media side edge is at 1x.)

It is possible to update or confirm the lookup table at the start of every scan with phosphor media which has this grating. That way, in cases where the galvanometer performance slowly changes with time, it would be compensated by the updated correction. With the exposure levels obtained in most radiographs this should be possible to do in a sufficiently large percentage of the exposures. In cases where the exposure is too low in some areas to read all the tick marks in the grating the last look up table values would be used without updating. For applications where the system cannot reliably detect the tick marks amongst the varying density patterns of a standard radiograph, the lookup table is generated with a calibration flat field exposure. This could be done in the same calibration run that uses a flat field exposure to generate the collector profile correction table.

Figure 9:
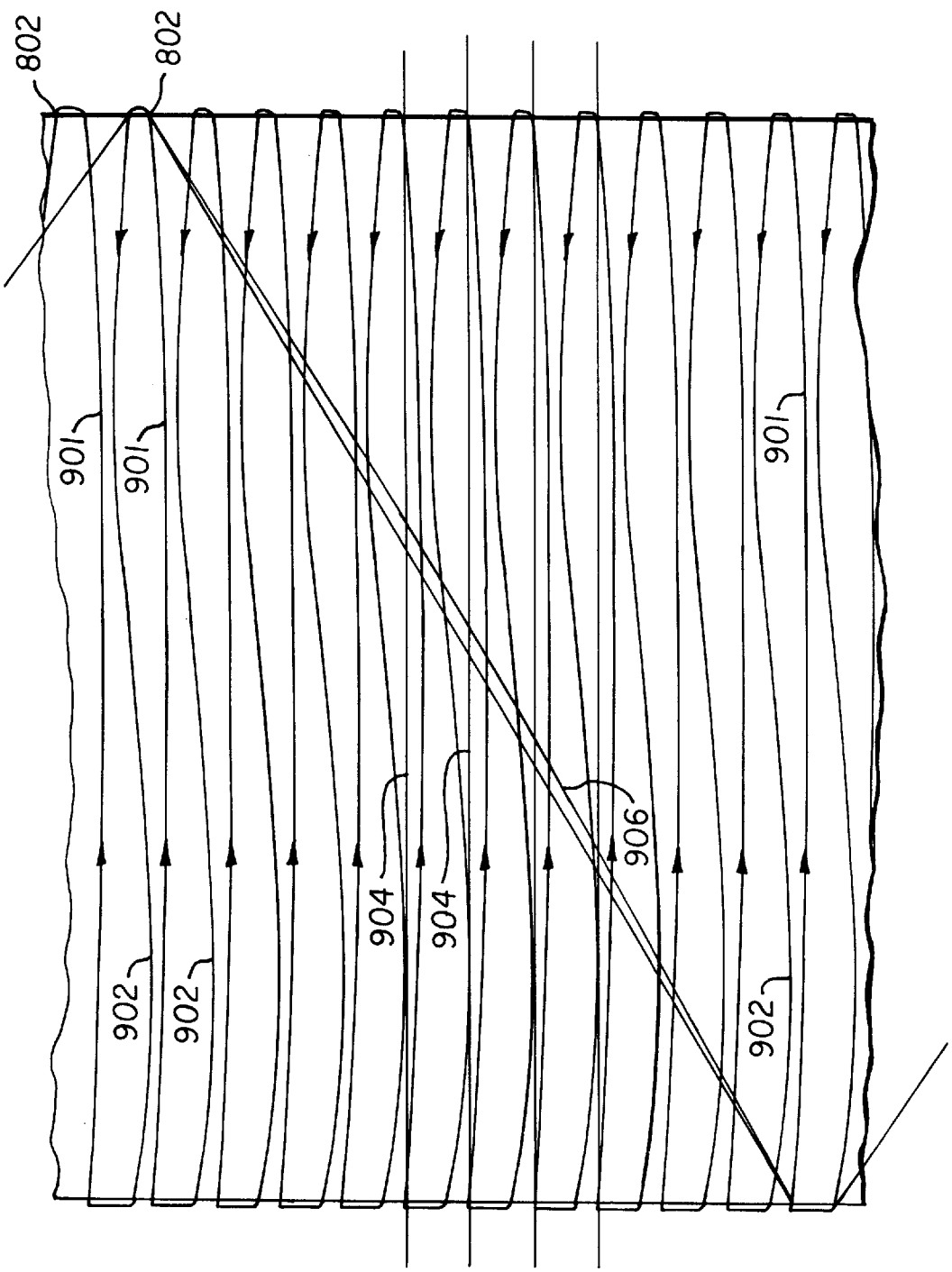
FIG. 9 is an example of displacement of alternate scan lines in the page-scan direction.

As stated, displacements of alternate scan lines in the page-scan direction may occur. A hypothetical scan pattern showing displacements of this type is shown in FIG. 9. Here, first scan trace 901 has a sagging bow, while second scan trace 902 has a sinusoidal bow. Trace 904 shows the route of a straight line. A first moveable mirror such as piezo-electric mirror 106, (see FIG. 2) will correct this type of error. In one embodiment this is done through the calculation and implementation of the necessary correction factors to provide an equal and opposite page-scan displacement to beam 102 from that introduced by the second, bidirectional, moveable mirror such as galvanometer mirror 108. In a preferred embodiment the generation of a table of correction factors is achieved through the same calibration run that provides the line-scan velocity and position correction and the collector profile uniformity correction.

To generate the page-scan error correction table the galvanometer velocity and line start corrections must first be made using calibration grating 702 as previously discussed and applied to the galvanometer driving profile. To then generate a piezo-electric correction table needed to correct line bow differences as shown in FIG. 4, a diagonal line must be available for the scanner to digitize. With a computed radiography scanner a diagonal line of sufficient quality can be generated by the scanner itself by increasing the page-scan transport velocity to 20X or 30X normal speed while scanning the flat field exposure. In a preferred embodiment this period of travel is at least equal to the time required to complete one line scan, which at the increased constant page scan velocity generates a diagonal trace. Several line scan cycles are preferred. This results in the laser draining zigzag energy troughs 802 in the flat field exposure as shown in FIGS. 8 and 9. The transport is then reversed and the zigzag "grating" generated at the high speed is then scanned at normal transport speed. The crossing of scan lines across the energy troughs generates the necessary data matrix to calculate the page-scan correction table for a first moveable mirror such as a piezo-electric mirror. In one embodiment using a film scanner or a computed radiography scanner, a calibration film or phosphor with the necessary lead edge grating and diagonal straight lines printed on its surface is used.

FIGS. 9 through 14 exemplify the process for generating piezo-electric correction data where the computed radiography scanner generates the diagonal line. In FIG. 9, diagonals 906 generated by the scanner have the same distortions (in this example a sag for left-to-right lines) as the scan lines 901 generated at the standard page-scan speed. The steps shown in FIGS. 10 through 14, generate the correction factors to be applied to the right-to-left piezo-electric driving signal ramp to make the right-to-left scan parallel and equidistant to the left-to-right scan lines.

Figure 10:
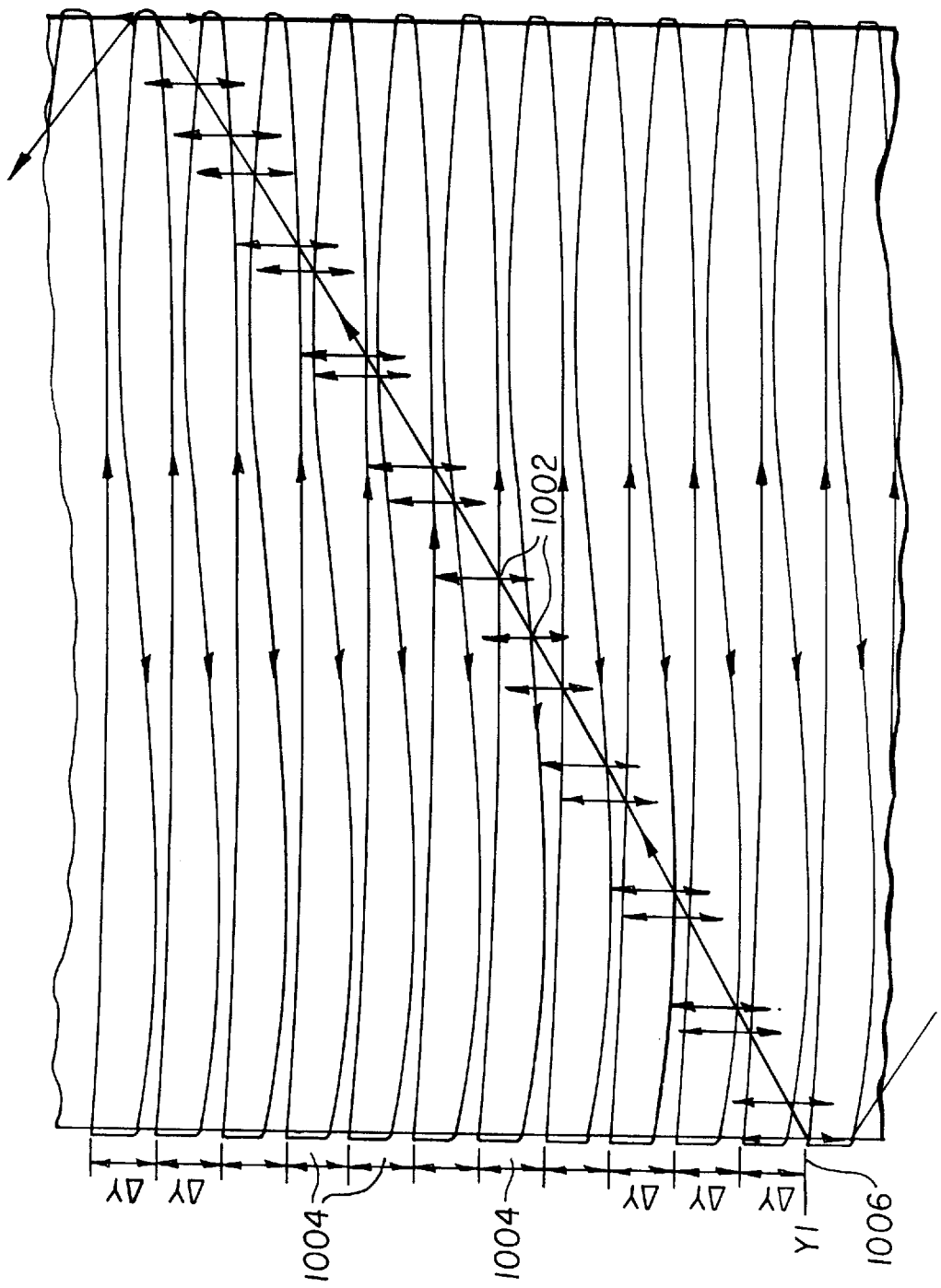
FIGS. 10–14 are explanatory diagrams showing steps to generating correction factors.

FIG. 10 exemplifies knowledge obtained after scanning the 20x trace: The x position of the intersection of 1x and 20x scans is known, but their y position 1002 is uncertain since we don't know the shape of the 20x line; $\Delta y$ increment 1004 that the phosphor travels during a galvanometer cycle is known, and knowledge pertaining to $y_1$ 1006 depends upon how well the y (page scan) drive motor position is controlled relative to galvanometer cycling.

Figure 11:
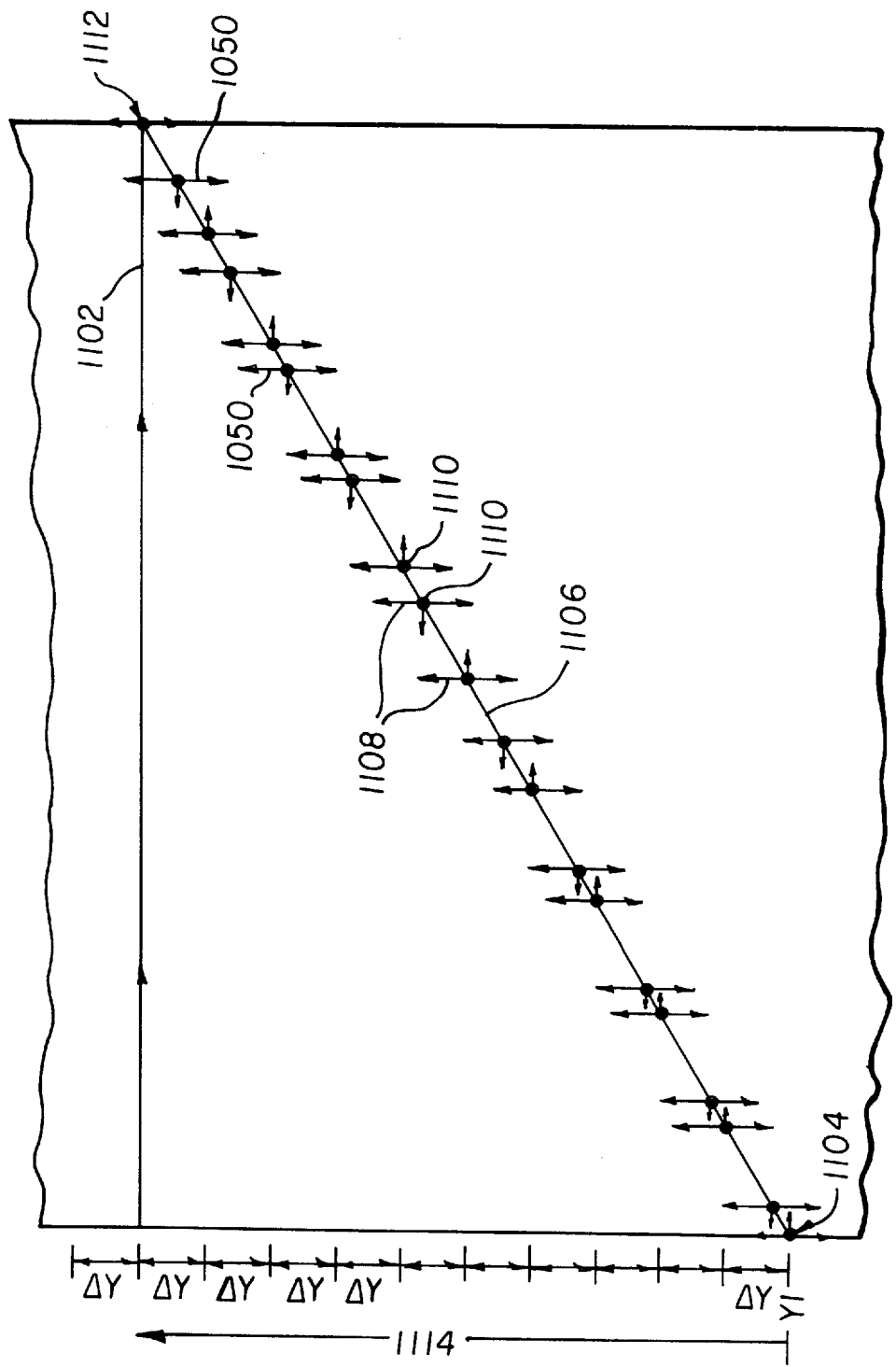

FIG. 11 graphs data points assuming a straight left-to-right trace 1102, a straight 20x scan trace 1106 and a $y_1$ position 1104. A point is plotted twenty scan lines or 10 times $\Delta y$ 1114 up from position 1104. Plotting straight line 1102 across from this point yields point 1112 (the end point of left-to-right 20x trace 1112). The straight line 1106 can now be drawn. The vertical lines 1108 indicate the known x positions of the crossing points of the normal speed scan lines with the 20x page scan speed left to right scan line. Points 1110 represent the location of the crossing points based on the straight 20x left to right scan line assumption.

Figure 12:
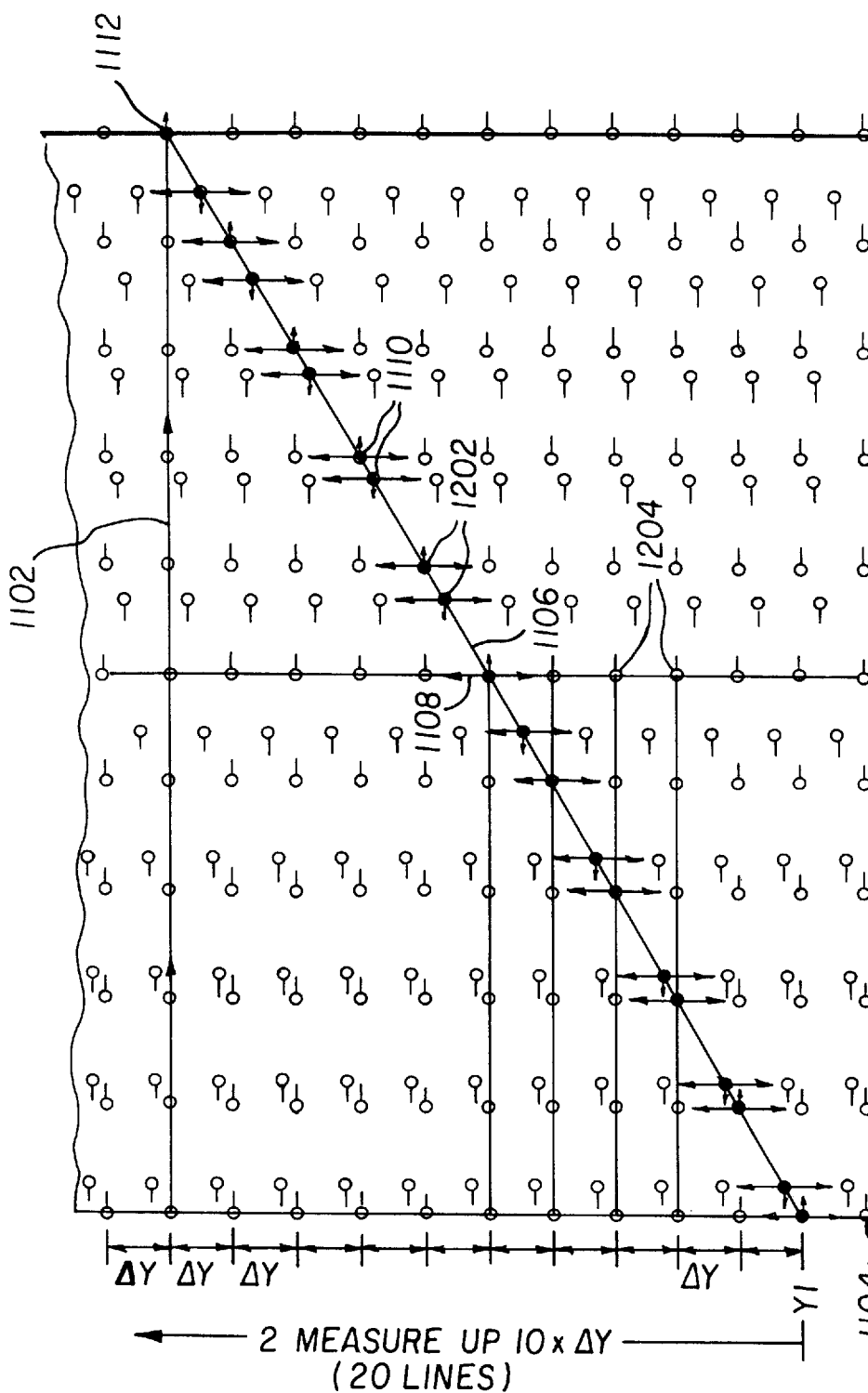

FIG. 12 exemplifies the inclusion of copies at $\Delta y$ increment of the data points calculated in FIG. 11. This is true if the scan profile does not change from cycle to cycle. By copying, data points from scan data 1202 at delta y increment to yield copies 1204, the necessary points are generated to reconstruct the scan line shapes.

Figure 13:
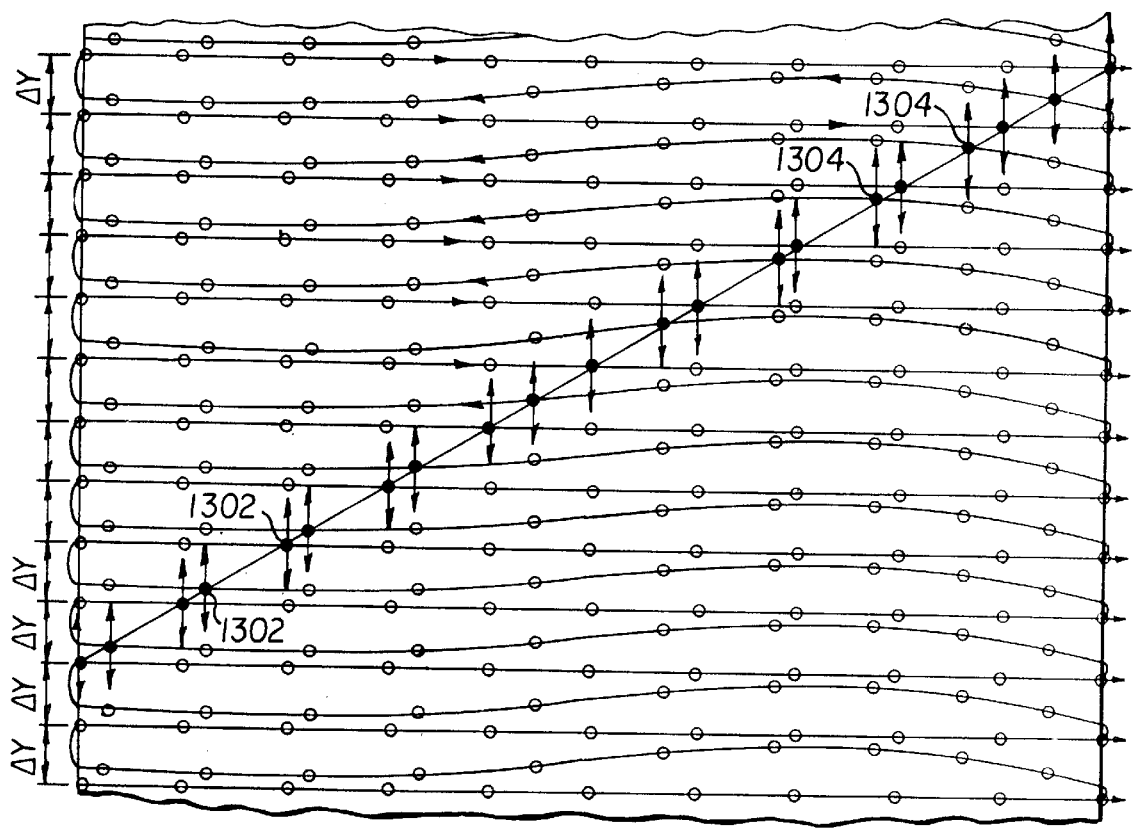

As exemplified by FIG. 13, curves are fitted through the data points plotted in FIG. 12 to represent right-to-left 1302 and left-to-right 1304 scan lines which correspond to 901 and 902 scan lines in FIG. 9 with the 901 line assumed straight.

Figure 14:
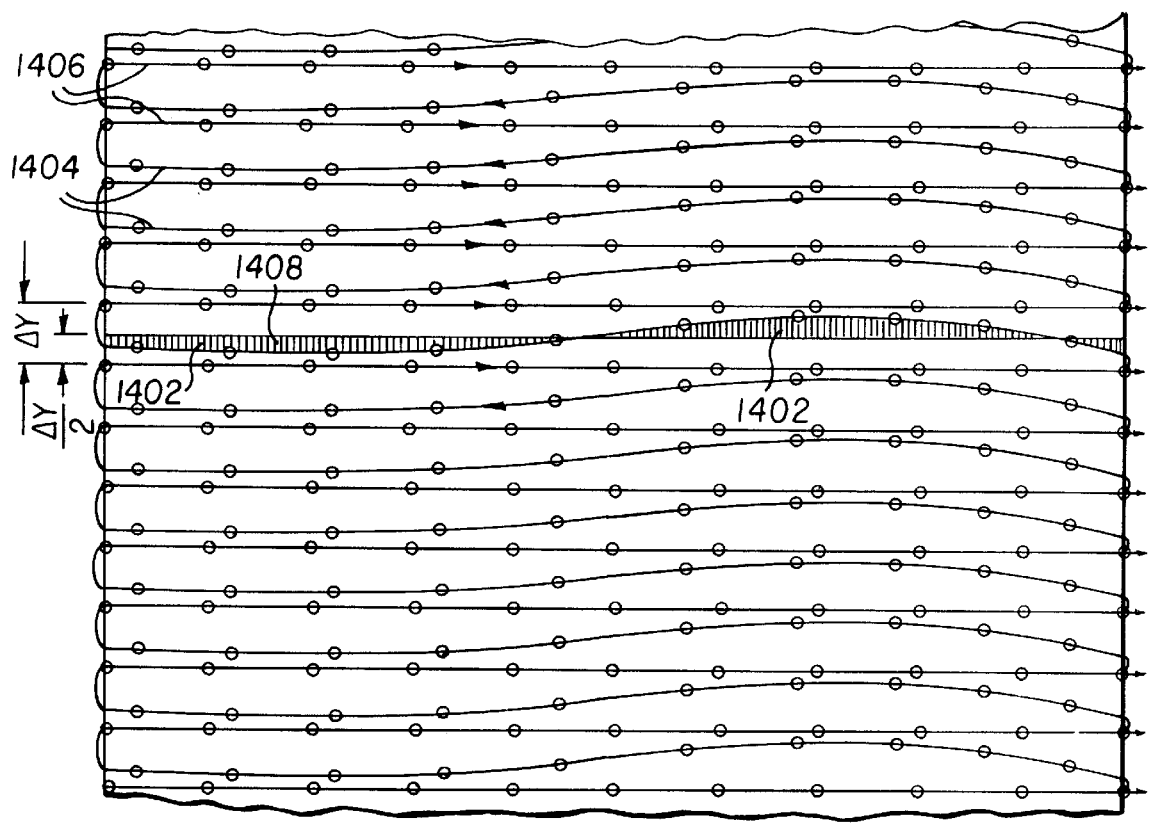
Figure 15:
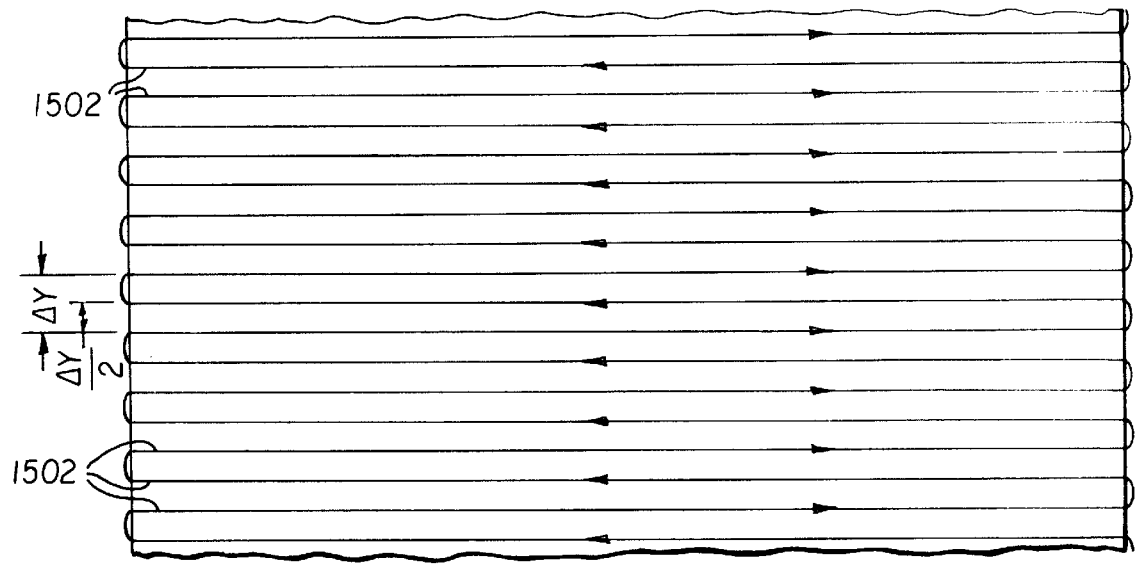
FIG. 15 is an explanatory diagram showing the corrected scan if left-to-right line-scan had been truly horizontal.
Figure 16:
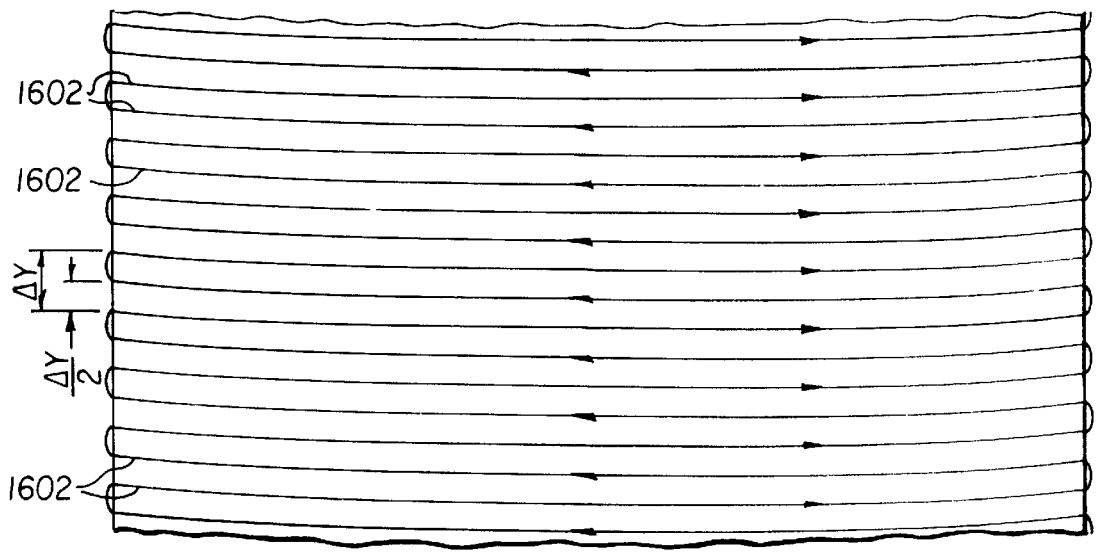
FIG. 16 is an explanatory diagram showing the corrected scan of the example.

FIG. 14 exemplifies correction factor 1402 used to straighten right-to-left scan lines 1404 making them equidistant to left-to-right scan lines 1406. As exemplified right-to-left scan line 1404 is corrected to corrected line 1408 which lies half way between the 1406 line preceding and following it. If the left-to-right lines 1406 are straight, the corrected results would consist of a series of straight parallel lines 1502 as shown in FIG. 15. Since left-to-right line 1406 was assumed straight for the calculations but really in this example corresponds to line 901 in FIG. 9 and had a sagging bow, the true corrected scan would depict equally sagging lines 1602, as shown in FIG. 16. This type of distortion, is in the range of 1/10 of a millimeter across the line-scan, and is insignificant. In a preferred embodiment a calibration film or phosphor that has accurate, straight, diagonal lines is used. In this embodiment a separate correction table can be calculated for the left-to-right and right-to-left scan lines, permitting a corrected scan to yield a series of parallel lines 1502 in all cases. Averaging corrections calculated using several diagonal lines aids in eliminating inaccuracies introduced by factors such as transport speed fluctuations. In a preferred embodiment, first and second moveable mirror correction tables are generated for each plate size and resolution combination to be scanned as different page-scan rates and galvanometer swings are involved.

In a preferred embodiment, the page scan axis beam motion in the bow-tie method of scanning and the implementation of correction factors therefore, are effectuated by altering the direction of the beam source itself, as opposed to deflecting the direction of the beam from a stationary source. Apparatus for performing and correcting the above described bow-tie method of scanning is found in FIGS. 17 through 32, and is described hereinafter. In laser aiming, the small beam displacements required for media tracking in the bow-tie scan pattern is accomplished by using positioner(s) such as piezo-electric positioners that act directly on the laser to provide page-scan direction beam displacement. FIGS. 17 and 18 show alternative apparatus for providing media tracking by means of laser aiming. In FIG. 17 there is shown laser assembly 1702, which emits laser beam 1704 from opening 1706 located at first end 1720 of laser assembly 1702. First end 1720 is coupled at first pivot point 1710 to first positioner 1712. Second end 1708 of laser assembly 1702 is coupled at second pivot point 1714 to second positioner 1716. In a preferred embodiment, first and second positioners 1712, 1716 are piezo-electric positioners. Laser assembly 1702 is pivoted to sweep the beam through a one-line pitch displacement at the media by raising or lowering at least one of first positioner 1712 or second positioner 1716, and thereby pivoting beam 1704 through angle 1718. In an alternative embodiment this beam pivoting is effectuated by raising or lowering only one of positioners 1712 or 1716, thereby using pivot point 1710 or 1714 corresponding to stationary positioner 1712 or 1716 solely as a pivot.

In FIG. 18 there is shown laser assembly 1702, which emits laser beam 1704 from opening 1706 located at first end 1720 of laser assembly 1702. Laser assembly 1702 is coupled to positioner 1804. In a preferred embodiment positioner 1804 is a piezo-electric positioner. Laser assembly 1702 is translated sideways through the full line pitch displacement distance to affect the line pitch displacement at the media by raising or lowering positioner 1804 and thereby translating beam 1704 through Δy 1806, in one embodiment this displacement can range up to 171 microns. The required positioner displacements are much smaller if the pivoting technique is used. For example, if the length of the laser diode assembly in FIG. 17 is two inches, then positioner 1712 must rise by about 5 microns (0.0002") as positioner 1716 is lowered by 5 microns to provide a 0.011" beam sweep. Or, alternatively, one positioner 1712 or 1716 is either raised or lowered 10 microns.

Figure 19:
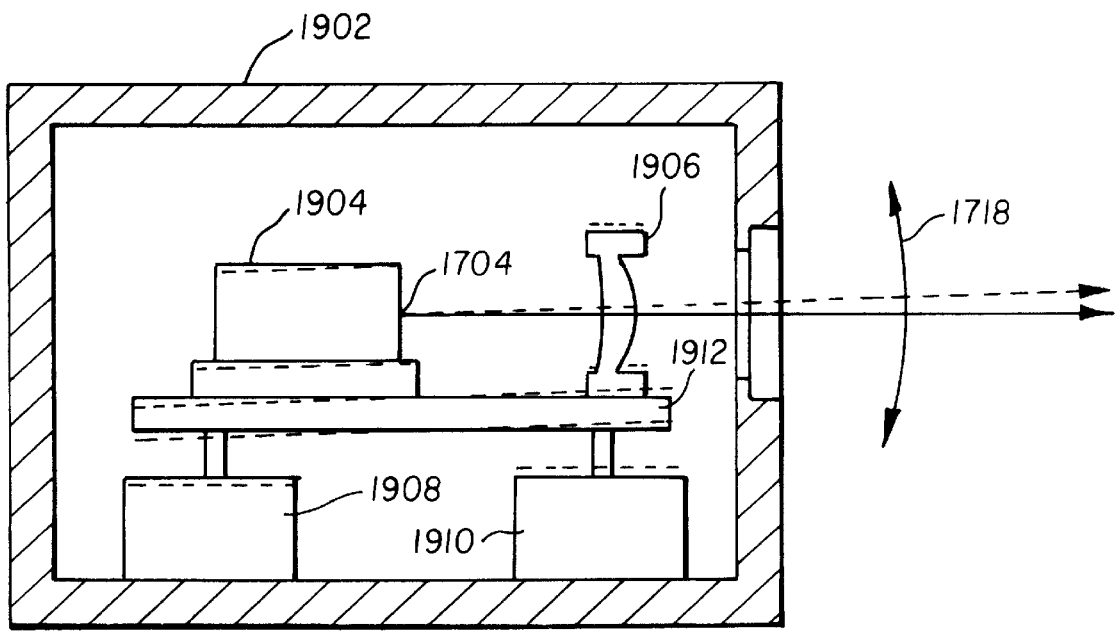
FIG. 19 is a schematic view of a pivoted laser assembly, where the positioners are located within the assembly housing.
Figure 20:
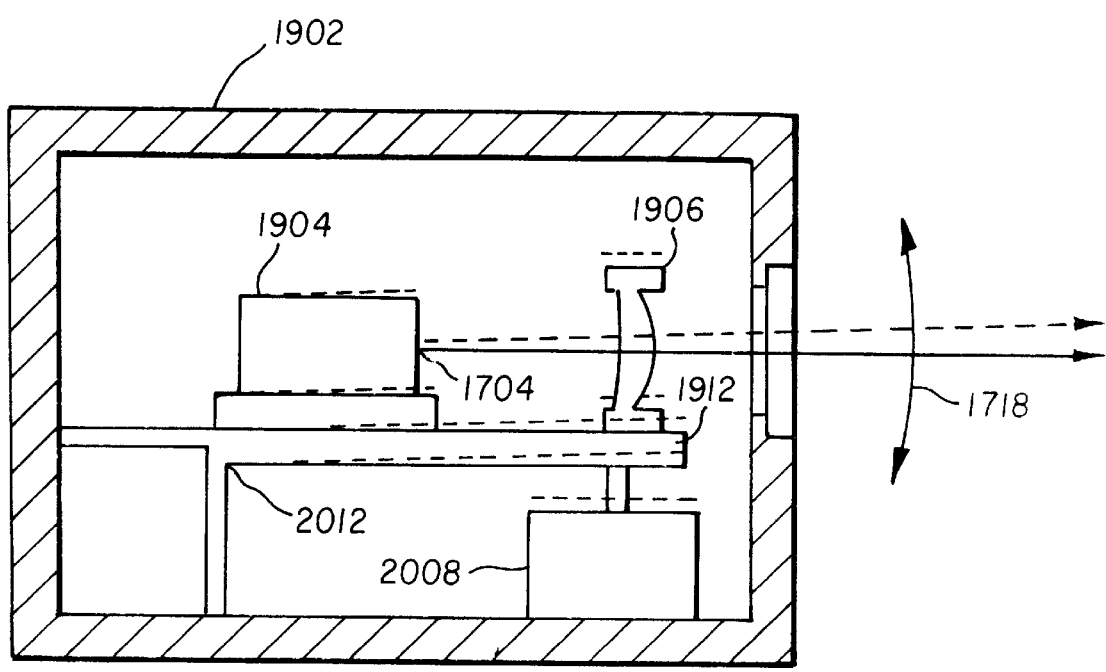
FIG. 20 is a schematic view of a pivoted laser assembly, where the positioner is located within the assembly housing.

FIG. 19 shows still another embodiment of the invention, where the mass of the pivoted parts is significantly reduced. Positioners 1908 and 1910 move only laser diode 1904, lens 1906 and mounting structure 1912 within assembly housing 1902. In this embodiment, beam 1704 is pivoted through angle 1718 by raising or lowering at least one of positioners 1908 or 1910. Similarly, in FIG. 20 positioner 2008 is used to move laser diode 1904, lens 1906 and mounting structure 1912 within assembly housing 1902 and relative to pivot 2012. In this embodiment laser beam 1704 is pivoted through angle 1718 by raising or lowering positioner 2008.

Figure 21:
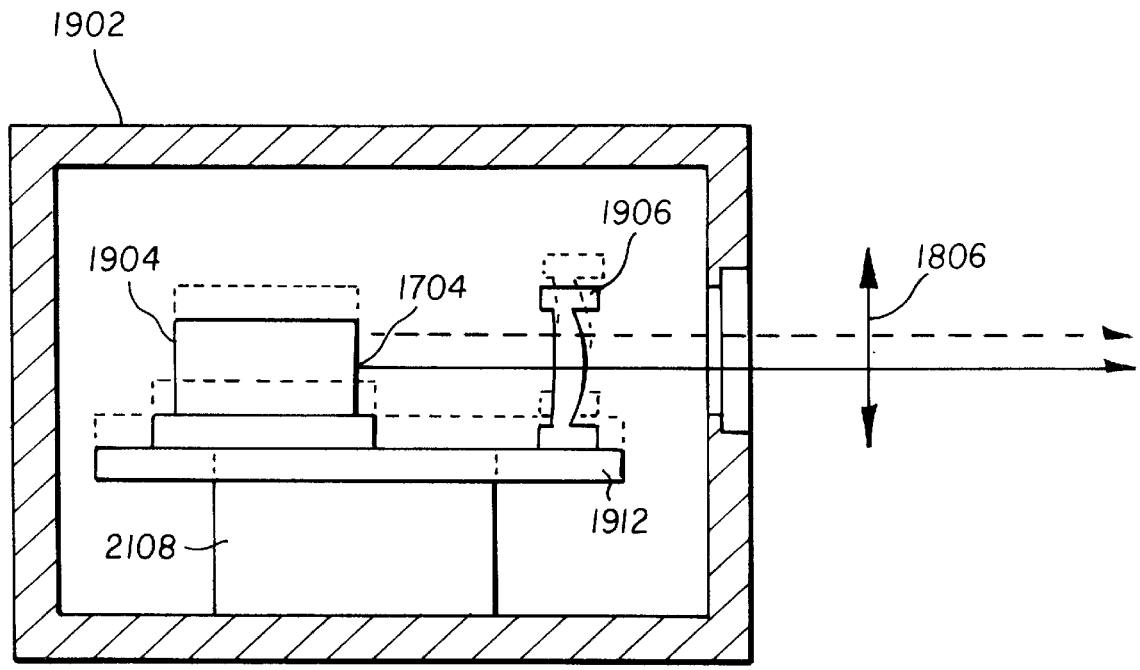
FIG. 21 is a schematic view of a translated laser assembly, where the positioner is located within the assembly housing.

FIG. 21 shows a non-pivoted translation embodiment applied only to the internal components. Again, in this unpivoted design, laser 1904 and lens 1906 travel up to the 171 micron (0.007") maximum line pitch distance but much less force is needed because of the smaller mass involved. Here, positioner 2108 is used to move laser diode 1904, lens 1906 and mounting structure 1912 within assembly housing 1902, thereby translating beam 1704 through Δy 1806.

Figure 22:
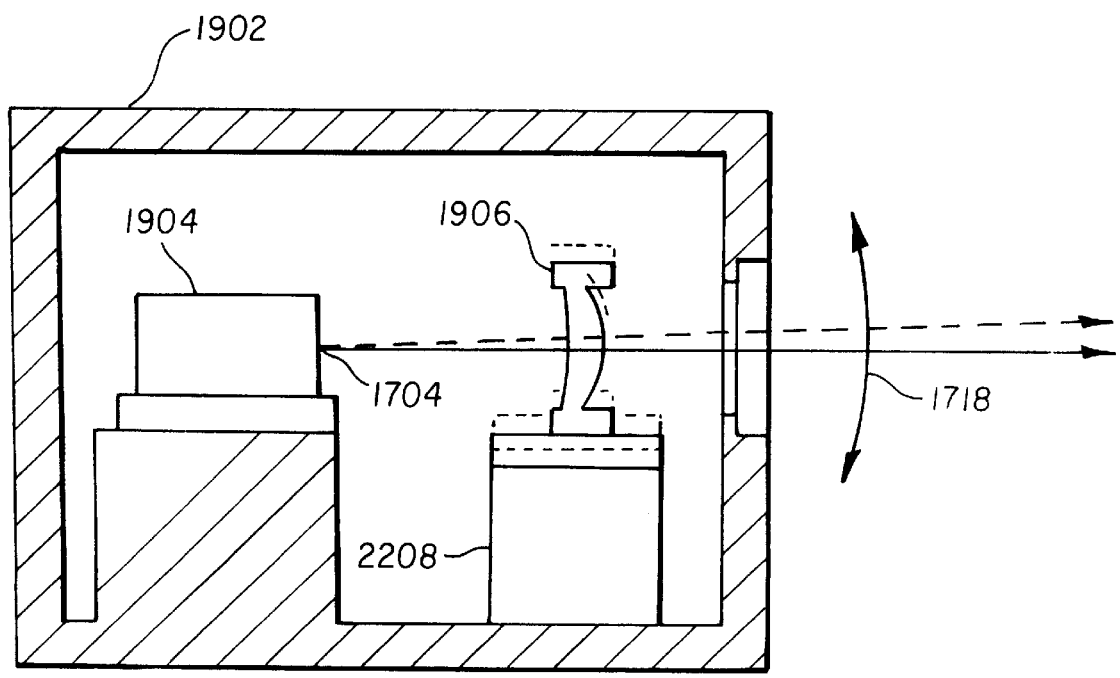
FIG. 22 is a schematic view of a laser assembly, where the positioner is located within the assembly housing, under the lens, to translate the lens thereby pivoting the projected beam.
Figure 23:
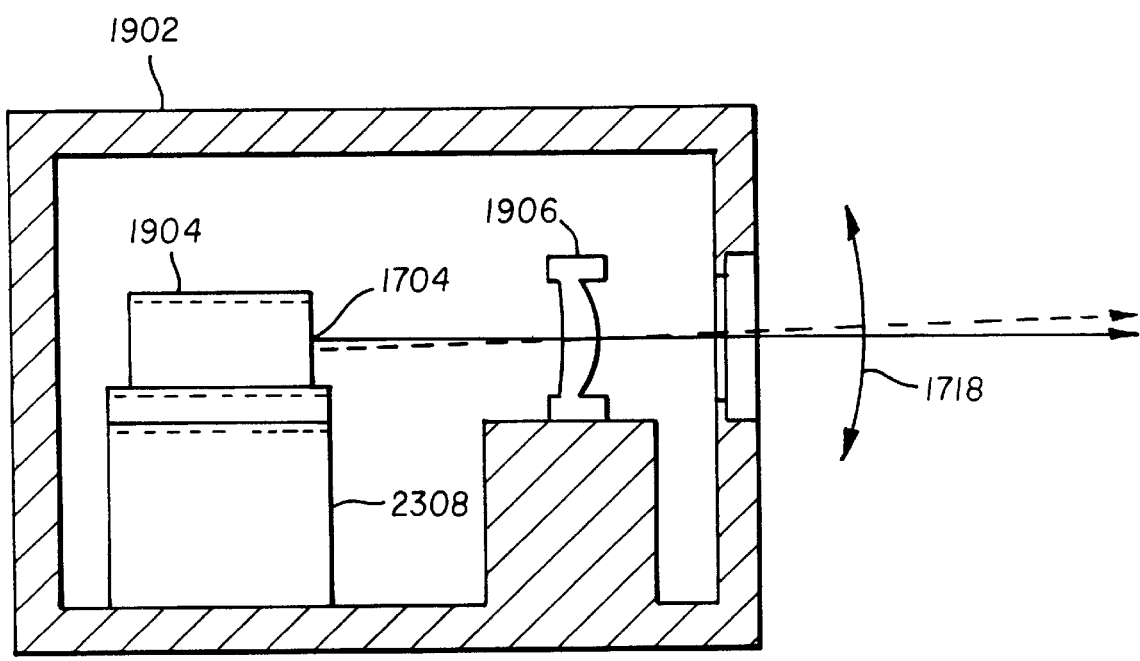
FIG. 23 is a schematic view of a laser assembly, where the positioner is located within the assembly housing, under the laser diode, to translate the diode thereby pivoting the projected beam.

FIGS. 22 and 23 show further embodiments for positioning the beam. In each design the positioner displacement required is in the range of that required for the designs in FIGS. 19 and 20 (5 to 10 microns) and much less than the 171 microns needed for the FIG. 21 design. A benefit of these approaches is that the acceleration forces are again reduced by reducing the mass of the moving components. While the gaussian profile of the beam will be altered slightly as it is pivoted by this technique, the small angles involved yield negligible distortions. In FIG. 22 positioner 2208 is used to move lens 1906, while laser diode 1904 remains stationary, laser diode 1904, lens 1906 and positioner 2208 all being within assembly housing 1902. The repositioning of lens 1906 results in beam 1704 being pivoted through angle 1718. Similarly, in FIG. 23 positioner 2308 is used to move laser diode 1904, while lens 1906 remains stationary. Laser diode 1904, lens 1906 and positioner 2308 all being within assembly housing 1902. The repositioning of laser diode 1904 results in beam 1704 being pivoted through angle 1718.

Although the invention has been described in detail for the purpose of illustration, it is understood that such detail is solely for that purpose, and variations can be made therein by those skilled in the art without departing from the spirit and scope of the invention, which is defined by the following claims.

PARTS LIST

100 Laser
102 Beam
104 Stationary mirror
106 Piezo-electric mirror
108 Galvanometer mirror 110 First control bus
112 Second control bus
114 Third control bus
116 Controller
118 Galvanometer
120 Media driver
122 Lens
124 Media
210 Deflection
302 Bow-tie pattern
304 Height
306 Width
308 First edge
312 Opposing edge
314 Media travel
316 Full bow-tie cycle
318 First location
320 Second location
322 Third location
324 Fourth location
350 Image
402 Adjacent lines
404 Narrow vertical features
406 Fine vertical features
408 Lines
410 Offset position errors
502 Repetitive position errors
602 Scan lines
702 Calibration grating
704 Storage phosphor sheet
706 Screen
802 Zigzag energy troughs
901 First scan trace
902 Second scan trace
904 Trace
906 Diagonals
1002 y position
1004 $\Delta y$ increment
1006 $y_1$
1102 Straight left-to-right trace
1104 $y_1$ position
1106 20x scan trace
1108 x position of points
1110 Intersection points
1112 Left-to-right 20x trace
1114 10 times $\Delta y$
1202 Scan data
1204 Copies
1302 Right-to-left scan lines
1304 Left-to-right scan lines
1402 Correction factor
1404 Right to left scan lines
1406 Left-to-right scan lines
1408 Corrected line
1502 Parallel lines
1602 Equally sagging lines
1702 Laser assembly
1704 Laser beam
1706 Opening
1708 Second end
1710 First pivot point
1712 First positioner
1714 Second pivot point
1716 Second positioner
1718 Angle
1720 First end
1804 Positioner
1806 $\Delta y$
1902 Assembly housing
1904 Laser diode
1906 Lens
1908 Positioner
1910 Positioner
1912 Mounting structure
2008 Positioner
2012 Pivot
2108 Positioner
2208 Positioner
2308 Positioner

What is claimed is:

1. An apparatus for scanning a media with a beam comprising:

means for moving said media continuously along a media path in one direction while said beam travels along a bow-tie path defined by a route that returns said beam to its initial position;

means for initiating movement of said beam from a line start location on a first edge of said media and moving said beam across said media to a second, opposite edge in a direction which traces a line scan path on the media and which is perpendicular to media travel;

means for moving said beam at said second edge of said media in a direction of travel opposite that of said media a distance approximate to the desired line spacing of said media;

means for moving said beam perpendicular to the direction which traces a line scan path on the media and which is perpendicular to media travel to return said beam to said first edge;

means for moving said beam along said first edge of said media in said direction of travel opposite that of said media path to return said beam to said line start location at said first edge ; and means for correcting position errors in movement of said beam.

2. An apparatus for scanning according to claim 1, wherein said means for correcting error includes:

means for correcting errors due to line scan velocity variations of said beam.

3. An apparatus for scanning according to claim 2, wherein said means for correcting errors includes:

means for correcting errors due to data collection clocking.

4. An apparatus for scanning according to claim 1, wherein said means for correcting errors includes:

means for correcting beam position errors due to beam aiming or deflection errors in the page scan direction.

5. An apparatus for scanning according to claim 4, further including:
   means for correcting errors due to variations in line scan velocity.

6. An apparatus for scanning according to claim 1, further comprising:
   means for averaging data to reduce page scan beam positioner correcting errors due to variations in media velocity.

7. An apparatus for scanning according to claim 1, wherein said means for correcting errors includes:
   means for maintaining a constant velocity of said beam as said beam travels across said media; and
   means for operating said beam to expose pixels, each said pixel spaced at equal displacement increments in line scan directions.

8. An apparatus for scanning according to claim 7, wherein said:
   means for correcting errors, includes:
   means for providing a calibration grating on a leading edge of said media, wherein said calibration grating comprises a series of parallel page scan direction lines of known spacing;
   means for setting line start in either direction relative to said calibration grating;
   means for detecting line start and line end;
   means for comparing line starts and line ends of sequential lines with said grating;
   means for determining differences between grating based timing pulse data and calibration timing pulse data; and
   means for storing said differences.

9. An apparatus for scanning according to claim 8, further comprising:
   means for retrieving said differences;
   means for generating a lookup table, wherein said lookup table contains calculated correction factors based upon said differences; and
   means for altering said beam movement responsive to said correction factors.

10. An apparatus for scanning according to claim 9, wherein said means for altering said beam movement further comprises:
    means for applying correction factors, wherein said correction factors are applied to achieve constant spot velocity.

11. An apparatus for scanning according to claim 10, wherein said means for altering said beam movement further comprises:
    means for applying correction factors, wherein said correction factors are applied to achieve clocking pixel data collection at equal spatial increments.

12. An apparatus for scanning according to claim 9, further comprising:
    means for generating a lookup table, wherein said generation comprises:
    means for correcting line scan velocity and line start;
    means for increasing said media velocity for a period of travel while scanning the flat field exposure;
    means for returning to the beginning of said media; and
    means for scanning at normal transport speed.

13. An apparatus for scanning according to claim 12, wherein said period of travel is at least equal to said time required to complete one line scan.

14. An apparatus for aiming a laser system comprising one or more moveable components including a laser source and a lens, while scanning a media with a beam, wherein said laser emits said beam, comprising:
    means for moving said media continuously along a media path in one direction while said beam travels along a bow-tie path defined by a route that returns said beam to its initial position;
    means for effectuating movement of said beam by altering the position of at least one of said movable laser components;
    means for initiating movement of said beam from a line start location on a first edge of said media and moving said beam across said media to a second, opposite edge in a direction perpendicular to said media path;
    means for moving said beam at a second edge of said media in a direction of travel opposite that of said media path, a distance approximate to a desired line spacing of said media;
    means for moving said beam perpendicular to said media path to return said beam to said first edge;
    means for moving said beam along said first edge of said media in said direction of travel opposite that of said media path to return said beam to said line start location at said first edge; and
    means for correcting position errors in movement of said beam.

15. The apparatus of claim 14 wherein said means for correcting errors includes:
    means for providing a calibration grating on a leading edge of said media, wherein said calibration grating comprises a series of parallel page scan direction lines of known spacing;
    means for setting line start in either direction relative to said calibration grating;
    means for detecting line start and line end;
    means for comparing line starts and line ends of sequential lines with said grating;
    means for determining differences between grating based timing pulse data and calibration timing pulse data; and
    means for storing said differences.

16. An apparatus for aiming a laser according to claim 15, further comprising:
    means for retrieving said differences;
    means for generating a lookup table, wherein said lookup table contains calculated correction factors; and
    means for altering said beam movement responsive to said correction factors.

17. An apparatus for aiming a laser according to claim 16, wherein said altering said beam movement step further comprises:
    means for applying correction factors, wherein said correction factors are applied to achieve constant spot velocity.

18. An apparatus for aiming a laser according to claim 16, wherein said altering said beam movement step further comprises:
    means for applying correction factors, wherein said correction factors are applied to achieve clocking pixel data collection at equal spatial increments.

19. An apparatus for aiming a laser according to claim 16, wherein:
    said means for generating a lookup table includes:
    means for correcting line scan velocity and line start;

means for increasing the page-scan velocity for a period of travel while scanning the flat field exposure;

means for returning to the beginning of said media; and means for scanning at normal transport speed.

20. An apparatus for scanning a beam in a bow-tie pattern while maintaining uniform exposure comprising:

a laser for generating said beam;

a lens for receiving and focusing said beam;

a first moveable mirror for receiving the focused beam and redirecting the beam along a first axis of motion onto a moving media, said first axis of motion being aligned with the travel of said media;

a second moveable mirror, for receiving said focused beam and redirecting said&beam along a second axis of motion onto said moving media, said second axis of motion being perpendicular to the direction of motion of said media; wherein said first moveable mirror redirects said beam a distinct spatial increment in a direction opposite that of page-scan when said beam reaches an end of said line-scan and wherein said second moveable mirror reverses direction of said beam in said line-scan direction when said beam reaches the end of said line-scan;

a calibration grating on a leading edge of said moving media, wherein said calibration grating comprises a series of vertical lines; and a lookup table, wherein said lookup table provides correction factors for said beam.

21. An apparatus for scanning according to claim 20, wherein said first moveable mirror further comprises a piezo-electric motor for moving said first moveable mirror.

22. An apparatus for scanning according to claim 20, wherein said second moveable mirror further comprises a galvanometer for moving said second moveable mirror.

* * * * *